APPARATUS IN A MULTIPLE-NEEDLE AUTOMATIC QUILTING MACHINE
Original Filed March 22, 1951 4 Sheets-Sheet 1
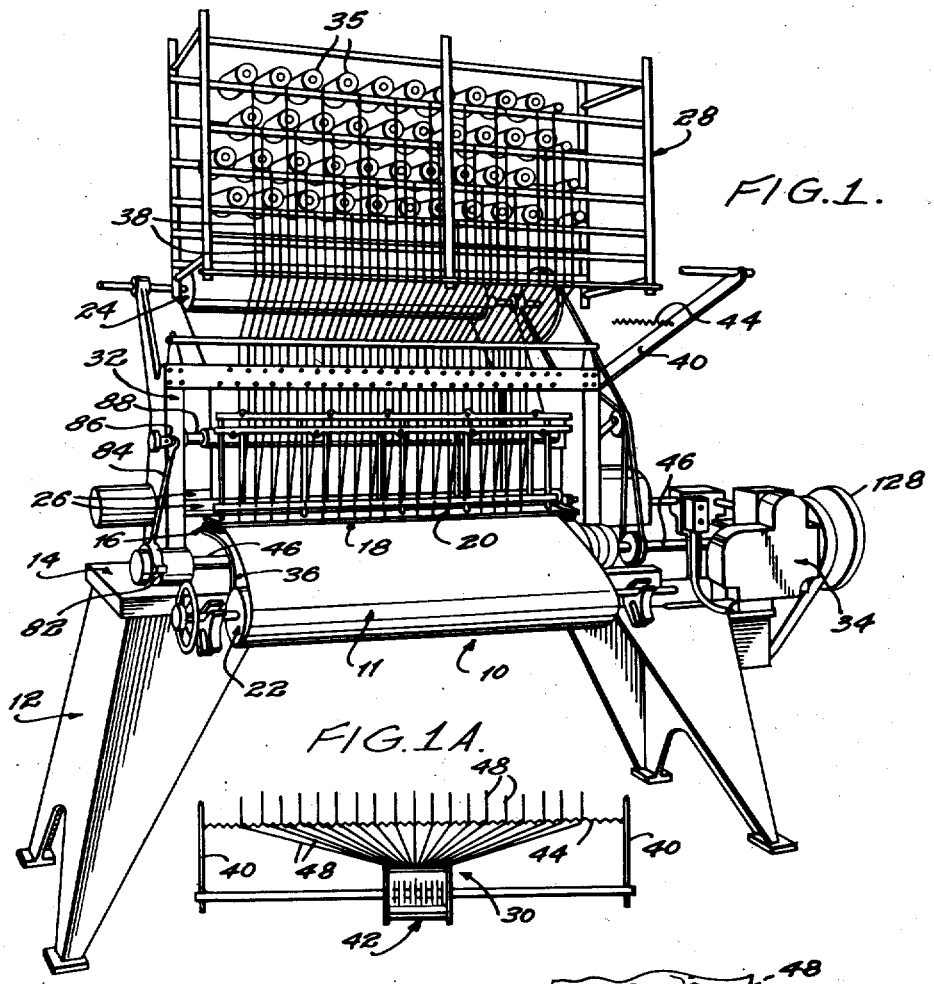
FIG. 1.
FIG. 1A.
FIG. 11.
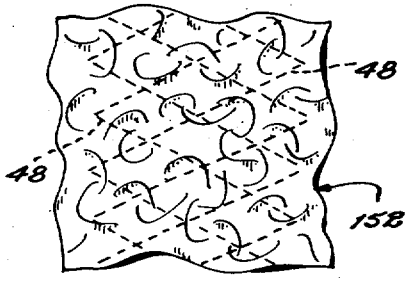
FIG. 12.
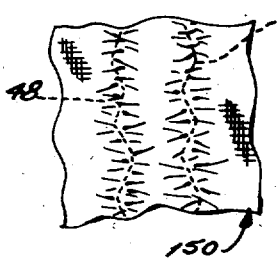
INVENTOR.
NATHAN SHOTSKY
BY Edwin Sewall &
Harry Cobb
ATTORNEYS

APPARATUS IN A MULTIPLE-NEEDLE AUTOMATIC QUILTING MACHINE

Original Filed March 22, 1951 4 Sheets-Sheet 2

INVENTOR.
NATHAN SHOTSKY
BY Edwin Denson
Harry Cohen
ATTORNEYS

APPARATUS IN A MULTIPLE-NEEDLE AUTOMATIC QUILTING MACHINE

Original Filed March 22, 1951 4 Sheets-Sheet 3

INVENTOR.
NATHAN SHOTSKY
BY Edwin Lewis &
Otto Pole
ATTORNEYS

APPARATUS IN A MULTIPLE-NEEDLE AUTOMATIC QUILTING MACHINE

Original Filed March 22, 1951 4 Sheets-Sheet 4

INVENTOR.
NATHAN SHOTSKY
BY Edwin Denson +
Otto Cole
ATTORNEYS

United States Patent Office

Re. 24,305
Reissued Apr. 23, 1957

24,305

APPARATUS IN A MULTIPLE-NEEDLE AUTOMATIC QUILTING MACHINE

Nathan Shotsky, Brooklyn, N. Y., assignor of one-fourth to Hersch Zauderer, one-fourth to Benjamin Zauderer, and one-fourth to David H. Turkel, all of Brooklyn, N. Y.

Original No. 2,687,703, dated August 31, 1954, Serial No. 216,990, March 22, 1951. Application for reissue September 28, 1955, Serial No. 537,315

10 Claims. (Cl. 112—100)

Matter enclosed in heavy brackets [ ] appears in the original patent but forms no part of this reissue specification; matter printed in italics indicates the additions made by reissue.

This invention relates to improvements in method and apparatus in a multiple-needle automatic quilting machine.

One object of the present invention is the provision of a novel mechanism and method for securing superposed threads to the surface of traveling fabric in a decorative pattern.

Another object of this invention is the provision of a novel mechanism for securing superposed threads to the surface of traveling fabric which is readily attachable to a conventional multiple-needle automatic quilting machine.

Another object of this invention is the provision of a novel automatic mechanism for securing superposed threads to the surface of traveling fabric which is readily adaptable to produce an infinite number of decorative surface patterns by a simple and quick machine adjustment and by the use of a variety of threads.

Another object of this invention is the provision of a novel automatic mechanism for securing a superposed thread to the surface of traveling fabric by lock-stitching with the stitching embracing and frictionally engaging the superposed threads.

Another object of this invention is the provision of a novel automatic mechanism and method for securing superposed threads to the surface of traveling fabric to produce shirred fabric and shirred and quilted fabric by a very simple, economical, and efficient means and method.

Another object of this invention is the provision, as a new and novel article of manufacture, of fabric having superposed thereon a plurality of threads in a pre-selected decorative pattern.

Another object of this invention is the provision, as a new and novel article of manufacture, of fabric having superposed thereon a plurality of threads in a pre-selected pattern to form shirred fabric or shirred and quilted fabric.

Another object of this invention is the provision, as a new and novel article of manufacture, of fabric having superposed thereon a plurality of threads in a pre-selected decorative pattern with the threads being secured to the surface of the fabric by automatic machine lock stitching.

Another object of this invention is the provision of a new and novel threading needle for use in threading a multiple-needle automatic quilting machine having mechanism for securing a superposed thread to the surface of traveling fabric.

Yet another object of this invention is the provision of a new and novel method of threading superposed threads in a multiple-needle automatic quilting machine having a mechanism for securing superposed threads to the surface of traveling fabric.

Other objects, features and advantages of the invention will become apparent as the description thereof proceeds when considered in connection with the accompanying illustrative drawings in which:

Fig. 1 is a front perspective view of a multiple-needle automatic quilting machine embodying the improvements of the present invention;

Fig. 1A is a partial top view of the superposed thread supply system;

Fig. 11 is a plan view of a fabric segment having superposed thereon elastic threads to form shirred and quilted fabric;

Fig. 12 is a plan view of a fabric segment having superposed thereon elastic threads to form shirred fabric;

Figure 2:
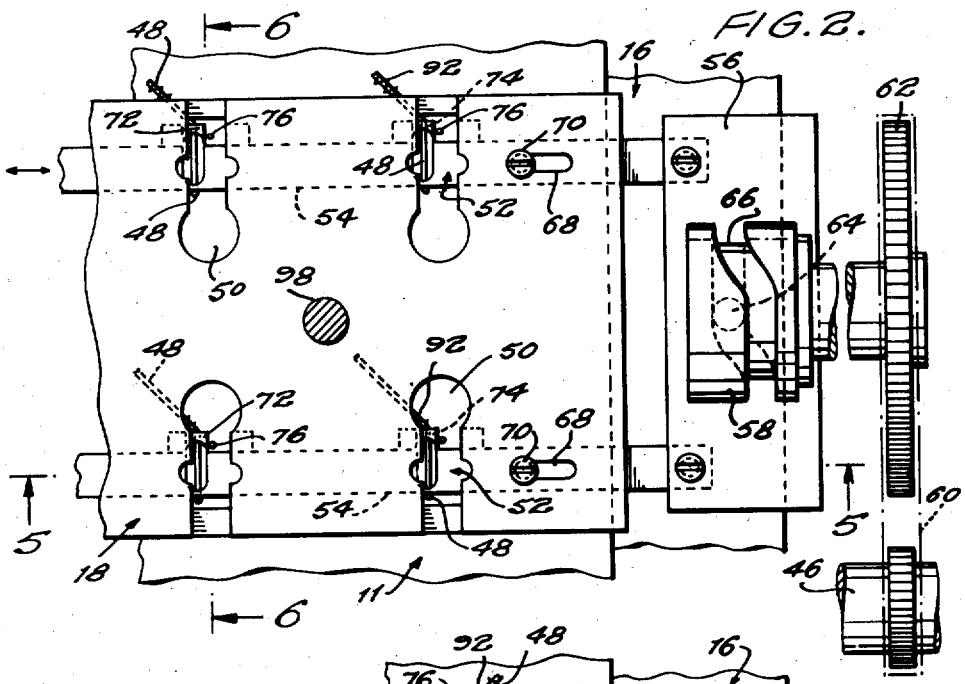
Fig. 2 is a plan view of the pressure plate, reciprocable bars, and the drive for the reciprocable bars with the bars shown in their left extreme position.

With reference to Figs. 1 and 1A the multiple-needle automatic quilting machine 10, embodying the present invention, comprises a supporting base 12; a reciprocating carriage 14, a fabric rest plate 16, a pressure plate 18, banks of reciprocable needles 20, a fabric supply roll 22, a processed fabric roll 24, feed rollers 26, a thread rack 28, superposed thread supply structure 30, frame structure 32, and motor drive and transmission structure 34. The thread rack 28 is adapted to support a plurality of thread supply spools 35 in which the threads 38 of the spools feed downwardly to the banks of needles 20. The superposed thread supply structure 30 comprises a pair of support members 40 which are adapted to support the superposed thread supply roll 42, which roll is utilized for a purpose to be described fully hereinafter. The threads 48 from the superposed thread supply roll 42 are fed to a horizontal spring guide 44 from which the threads 48 are fed to the surface of the traveling fabric 11 in a manner to be described in detail hereinafter.

Figure 14:
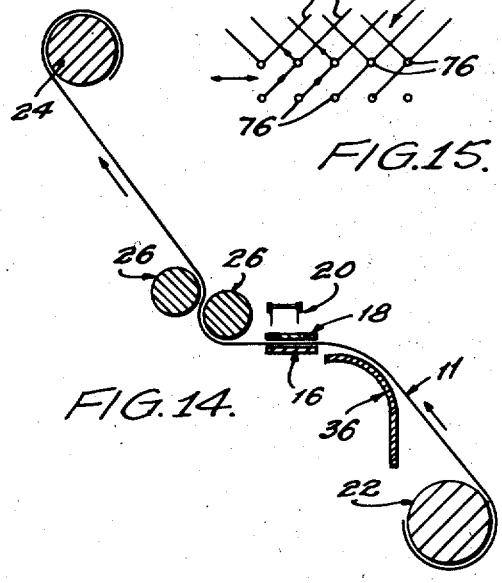
Fig. 14 is a schematic illustration of the path of travel of the fabric from the supply roll to the processed fabric roll.
Figure 16:
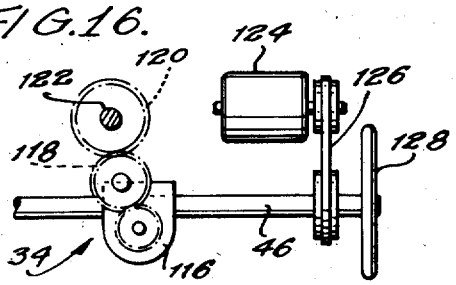
Fig. 16 is a partial plan view showing the motor drive and transmission to the cam drive for the carriage.

With reference to Fig. 14 there is shown a schematic illustration of the path of travel of the fabric 11 from the supply roll 22 to the processed fabric roll 24. The traveling fabric 11 passes onto the guiding apron 36 from which it is fed between the fabric rest plate 16 and the pressure plate 18 by means of the feeding rollers 26. The feeding rollers 26 are driven intermittently at a constant speed from the main drive shaft 46 (Fig. 16). From the feeding rollers 26 the fabric is fed to the processed fabric roll 24. With reference to Fig. 1, the fabric rest plate 16 is fixed to, and *reciprocates* [reciproactes] with, the reciprocating carriage 14, whereas the pressure plate 18 is mounted on the automatic quilting machine 10 independently of said carriage 14. The fabric rest plate 16 is fixed to the carriage 14 in any conventional manner and it is to be understood that said rest plate and carriage combination is conventional in all respects.

In a conventional multiple-needle automatic quilting machine the banks of needles 20 are adapted to bond or sew together a plurality of layers of cloth or other textile material by stitching them automatically in various decorative patterns. The present invention provides for an attachment for such a conventional multiple-needle automatic quilting machine for securing a superposed thread to the surface of the traveling fabric 11 in any preselected decorative pattern.

Figure 3:
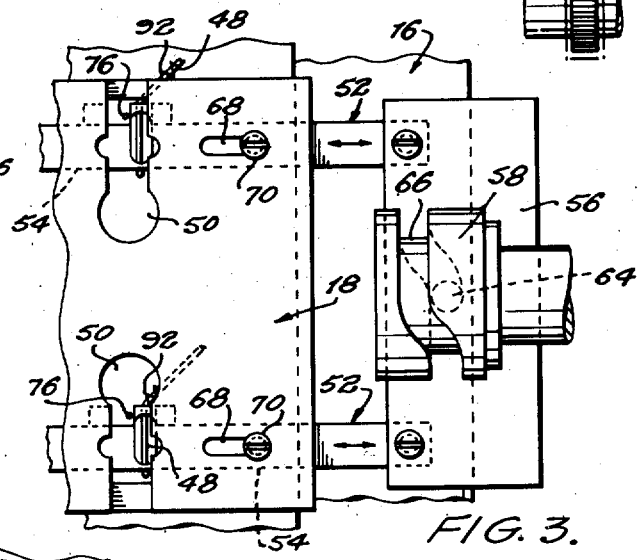
Fig. 3 is a view similar to Fig. 2 with the bars shown in their right extreme position.
Figure 4:
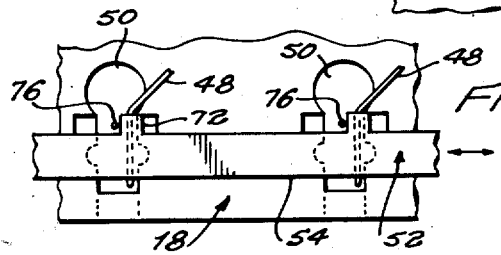
Fig. 4 is a partial detail view of the bottom of the pressure plate.

With reference to Figs. 2 to 4 applicant's attachment mechanism for securing the superposed thread 48 to the surface of the traveling fabric 11 comprises a longitudinally slotted pressure plate 18 and a plurality of bars 52. The pressure plate 18 is longitudinally slotted at 54 and the bars 52 are adapted to mate with the slots 54. The pressure plate 18 has a plurality of spaced cut-out portions 50 which are used for a purpose to be described in detail hereinafter. Bridging the bars 52 is a transverse connector member 56 which is fixed to the bars 52 and which is adapted to synchronously reciprocate said bars relative to the pressure plate 18. In order to effect the reciprocation of the connector member 56 and thereby effect the reciprocation of bars 52, there is provided a rotating cam 58 which is driven from the main drive shaft 46 by means of the chain drive 60 and gear 62. Rigidly secured to the connector member 56 is a cam follower 64 which is adapted to ride in the slot 66 of the rotating cam 58 to impart to the bars 52 an intermittent reciprocating motion, as will be evident from Figs. 2 and 3. There is provided in the plate 18 a plurality of spaced slots 68 which are adapted to cooperate with the posts 70 fixed to the bars 52 for guiding the bars 52 during their reciprocation. In Fig. 2 the bars 52 are shown in their left extreme position whereas in Fig. 3 the bars 52 are shown in their right extreme position, the reciprocating and positioning of said bars being effected by the previously described rotating cam 58 and follower 64. Bars 52 have a plurality of spaced integral protuberances 72 which are adapted to guide the superposed threads 48 relative to the surface of the traveling fabric 11. There are provided aligned, transverse apertures 74 passing through the bars 52 and protuberances 72, said apertures 74 being adapted to receive a superposed thread 48 from the feed source or supply roll 42. It will be readily apparent that the protuberances 72, being integral with the bars 52, will intermittently reciprocate with said bars 52 between the extreme positions shown in Figs. 2 and 3. The exact shape and design of the protuberances 72 is not of controlling significance and any protuberances 72 may be utilized in the system to effect the proper positioning and guiding of the superposed thread 48 relative to the surface of the traveling fabric 11. Spaced cut-out portions 50, of the pressure plate 18, are located complementary to the protuberances 72 and to the area adjacent to the transverse apertures 74, to provide clearance for said protuberances and the area adjacent to the transverse apertures 74 on the reciprocation of the bars 52. The cut-out portions 50 are also provided to effect clearance for threading the protuberances 72 and the transverse apertures 74 with a superposed thread 48 as will be more fully described hereinafter.

Figure 5:
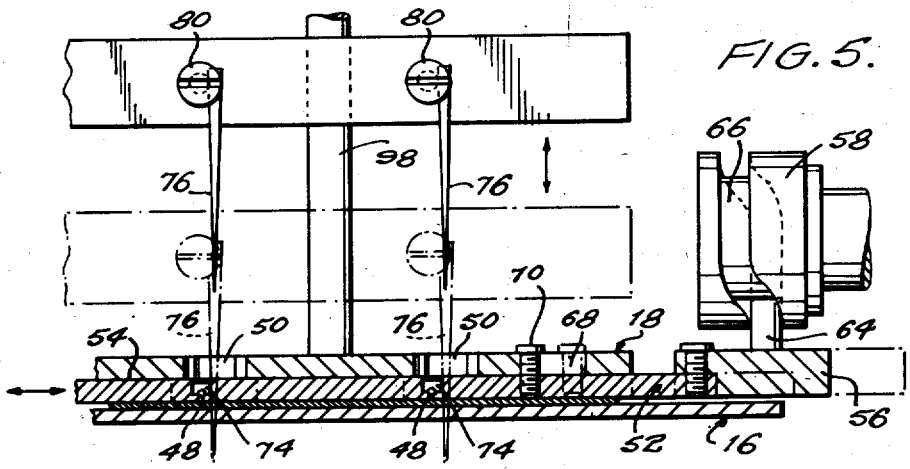
Fig. 5 is a sectional view taken on the line 5—5 of Fig. 2 and showing the needles in both of their extreme positions.
Figure 6:
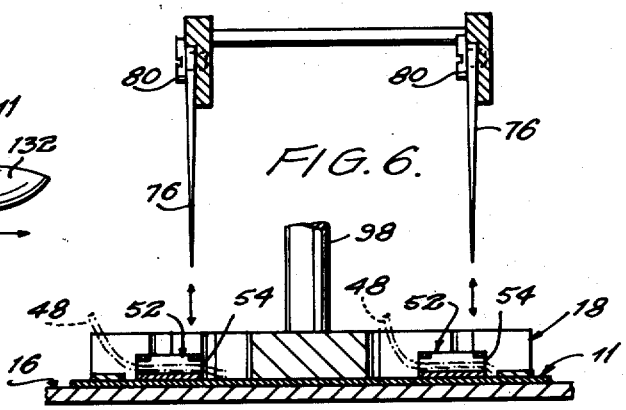
Fig. 6 is a sectional view taken on the line 6—6 of Fig. 2.

The banks of needles 20 comprise a plurality of spaced needles 76 mounted in two rows with a predetermined number of needles in each row (Figs. 5 and 6). It will be readily understood that any number of rows of needles, and any number of needles in each row, may be used depending on the decorative pattern selected.

Figure 13:
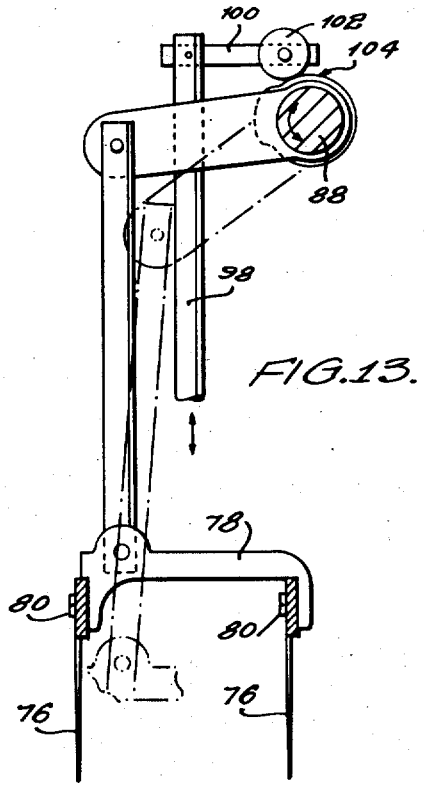
Fig. 13 is a side elevational view showing a pair of reciprocable needles and their driving means in both extreme positions.
Figure 18:
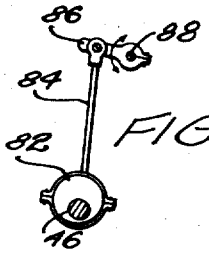
Fig. 18 is a detailed view in side elevation of the reciprocable needle driving means.

With reference to Figs. 13 and 18, the needles 76 are adapted to reciprocate vertically in a fixed path to lock-stitch the superposed threads 48 to the surface of the fabric 11. All the needles 76 reciprocate in unison and both rows of needles are secured to the needle bracket 78 in any conventional manner as by screws 80. The needles 76 are reciprocated between the extreme positions shown in Fig. 13 by means of eccentric 82, connecting link member 84, and arm 86 connected to the shaft 88. It will be understood that on the rotation of the main drive shaft 46, needles 76 are reciprocated intermittently in a predetermined sequence as more fully described below. The protuberances 72 of the reciprocable bars 52 are adapted to reciprocate across the fixed needle path sequentially whereby on one down stroke of the needles 76 the latter enters the travelling fabric 11 to stitch the superposed thread 48, with the protuberances 72 positioned adjacent to and at one side of said needles, and on the next down stroke of said needles the latter again enters the fabric 11 to stitch the superposed thread 48, with the protuberances 72 positioned adjacent to and at the otherside of said needles, to complete a cycle. Thus it will be seen that the protuberances 72 are adapted to reciprocate across the paths of the needles in timed sequential relationship with respect to the needles 76 whereby on the down stroke of said needles the latter penetrates the traveling fabric 11 to stitch the superposed threads 48 to said fabric with the thread-bearing protuberances 72 positioned adjacent to and on alternate sides of said needles 76. The protuberances 72 thereby guide the superposed threads 48 relative to the surface of the traveling fabric 11 and the path of the needle 76. The superposed threads 48 are lock-stitched to the fabric 11 by the needles 76 and it will be seen that each stitch will be in substantial alignment and on alternate sides of the superposed threads 48. It will be understood that the intermittent axial reciprocation of the bars 52 may be sequentially timed with the reciprocable needles 76 as described above in any conventional manner.

In operation, threads adapted to lock-stitch the superposed threads 48 to the surface of the fabric 11 are fed from the spools 35 to the apertures 90, of the needles 76, whereas the superposed threads 48 are fed from the supply roll 42 to the spring guide 44 and are then threaded through the aligned transverse apertures 74, passing through the bars 52 and protuberances 72. From the above it will be seen that the needles 76 reciprocate in a fixed vertical path whereas the superposed thread 48 is reciprocated in a horizontal plane relative to the surface of the traveling fabric 11 and the needles 76. Although the superposed threads 48 reciprocate in the above described manner, in the final product said superposed threads are restrained straight by means of the lock-stitches 92 as shown in the fabric segment 94, illustrated in Fig. 10.

In order to allow the traveling fabric 11 to intermittently pass between the rest plate 16 and the pressure plate 18, the pressure plate 18 is adapted to reciprocate intermittently, relative to the plate 16 of the machine 10, in a vertical path. *The vertical movement of the pressure plate 18 is a relatively small amount and there is sufficient clearance between the inner end of follower 64 and the bottom of slot 66 to permit such small vertical movement.* With reference to Figs. 5 and 13 this reciprocation of the pressure plate 18 is effected by means of a shaft 98, fixed to said plate, transverse member 100 fixed to shaft 98, and follower 102, mounted on member 100, which rides on cam 104 and which is integral with the shaft 88. It will be apparent from Fig. 13 that on the rotation of the shaft 88 the cam 104 will intermittently reciprocate shaft 98 to which is secured the pressure plate 18.

Figure 17:
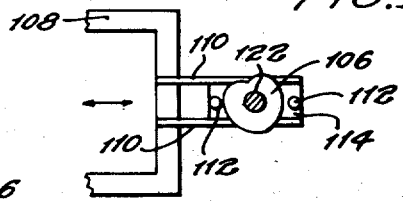
Fig. 17 is a detail partial plan view showing the cam drive for the carriage.

The carriage 14 reciprocates intermittently in a horizontal plane by means of cam plate 106 (Fig. 17). The carriage 14 is provided with frame structure 108 to which is attached horizontal members 110 outboard of said frame 108. A pair of spaced cam followers 112 is secured to plate 114 which is in turn fixed to the members 110, the followers 112 being adapted to cooperate with the rotating cam plate 106 whereby on the rotation of said cam plate 106 the frame 108 and the carriage 14 will be intermittently reciprocated. With reference to Fig. 16, the cam plate 106 is driven from the main shaft 46 through the intermediary of the gear case 116 and transmission gears 118 and 120, the gear 120 driving the cam shaft 122 and the cam plate 106. The main shaft 46 is driven from any suitable power source such as motor drive 124 and belt 126. A hand wheel 128 is connected to main drive shaft 46 to manually drive machine 10. It will be understood that the bars 52, the needles 76, the pressure plate 18 and the carriage 14 are all driven from motor drive 124 with a constant speed intermittent motion and are all sequentially timed to properly coordinate their relative movements.

Figure 7:
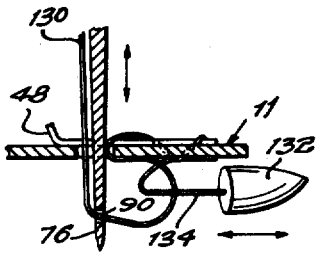
Fig. 7 is a partial detail view showing the method of lock stitching the superposed thread to the fabric.

In Fig. 7 there is shown the method of lock-stitching the superposed threads 48 to the traveling fabric 11. The superposed threads 48 rest on the surface of the traveling fabric 11 and the needle 76 bearing the front thread 130 of the lock-stitch penetrates the fabric 11. This forms a loop from the thread 130 at which time the shuttle 132 bearing the rear thread 134 of the lock-stitch passes through the loop and on the retraction of the needle 76 the loop formed by the thread 130 is closed, thereby forming the lock-stitch. It will be understood that the front thread of the lock-stitch 130 is fed from the spools 35 mounted in the thread rack 28 and has its end fixed in the fabric 11. The shuttle 132 reciprocates in a shuttle receptacle (not shown) in a conventional manner. The above described lock-stitching method and apparatus, without relation to the superposed threads 48, operates on the conventional lock-stitch sewing machine principle which is used in conventional multiple-needle automatic quilting machines.

Figure 8:
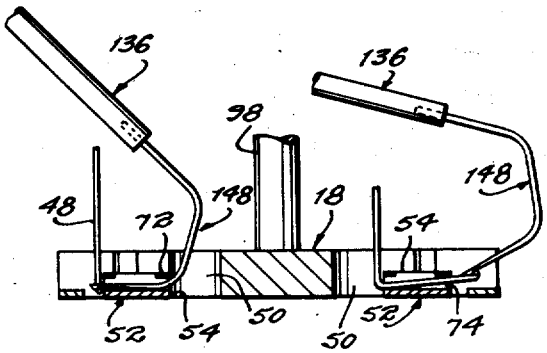
Fig. 8 is a transverse cross sectional view through the pressure plate showing the method of threading the superposed thread in the reciprocable bars.
Figure 9:
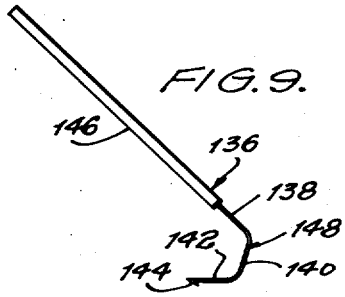
Fig. 9 is an elevational view of the threading needle fixed to a handle.

In order to thread machine 10 with the superposed thread 48 there is provided a threading needle 148 fixed in handle 136 (Fig. 9), the threading needle 148 comprising a straight shank 138, a connected generally arcuate portion 140, forming a generally obtuse angle with the shank 138, and a generally straight portion 142 extending from the portion 140 inwardly toward the shank 138, the straight portion 142 forming an obtuse angle with the generally arcuate portion 140. The portion 142 has a hooked end 144 which is adapted to engage the thread 48 and the portions 138, 140 and 142 are all integral, the shank 138 being suitably secured to the elongated handle 146. With reference to Fig. 8, the method of threading the superposed threads 48 to the bars 52 and protuberances 72 comprises the steps of mounting the hooked threading needle 148 into a cut-out portion 50 and through the transverse apertures 74 from the opposite side of said apertures to the direction of thread travel from the feed source 42, hooking the thread 48, and retracting or backing the threading needle 148 out of the transverse apertures 74 and the complementary cut-out portion 50. It will be understood that the above threading method provides for the thread 48 being hooked at 144 of needle 148 in a doubled condition and being pulled through the apertures 74 to thread the bars 52 with the superposed thread 48.

The above described apparatus also provides a method of shirring fabric by securing a superposed elastic thread to the surface of the traveling fabric 11 in any preselected decorative pattern. The method is carried out by supplying elastic threads 48 to the superposed thread feed source 42 and feeding said elastic threads to the fabric 11 under tension in any conventional manner. In other words, elastic threads are substituted for inelastic threads at the thread supply source 42 and said elastic threads are fed under tension. In Fig. 12 there is shown a segment of shirred fabric 150 which is formed in accordance with the above method by superposing on the fabric an elastic thread 48 and securing said thread to the surface of the fabric 11 under tension so that the thread is secured to the fabric in a preselected position, and on the tension release of the elastic thread 48, a shirred decorative surface pattern is formed in the fabric.

Figure 10:
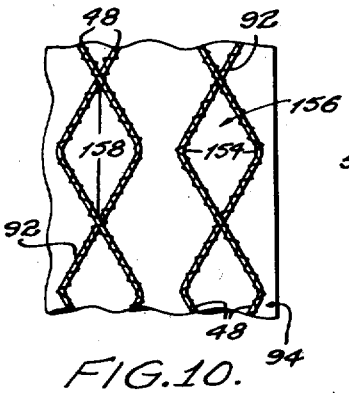
Fig. 10 is a plan view of a fabric segment having superposed thereon threads in a pre-selected quilted pattern.
Figure 15:
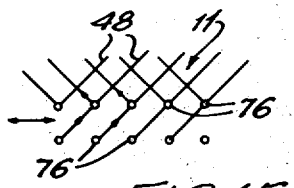
Fig. 15 is a partial plan view showing the path of fabric travel relative to the reciprocable needles.

The above described method may also be used for shirring and quilting fabric by securing superposed elastic threads to the surface of traveling fabric 11 to form a quilted pattern in any pre-selected design by the use of superposed elastic threads 48. With reference to Fig. 11 there is shown a segment of shirred and quilted fabric 152 having superposed thereon a plurality of elastic threads 48 in a pre-selected decorative pattern with the elastic threads 48 being secured to the surface of the fabric under tension by lock-stitching. It will be apparent that the lock-stitching as previously described embraces and frictionally engages the threads 48 in a staggered path whereby said threads are secured to the fabric in a pre-selected quilted pattern so that on the tension release of the elastic threads 48, a shirred and quilted decorative surface pattern is formed in the fabric. It will be readily understood that the fabric segments 150 and 152 are formed by the use of the apparatus of the present invention with the superposed thread supply source 42 supplying elastic threads 48. In Fig. 10 there is shown a fabric segment 94 in which the superposed thread 48 is inelastic and is formed in a quilted pattern, whereas in Fig. 11 there is shown a fabric segment 152 bearing the same superposed thread surface design in which the superposed thread 48 is elastic. In Fig. 15 there is shown the path of travel of the fabric 11 relative to the reciprocable needles 76, it being understood that the needles 76 reciprocate in a fixed vertical path whereas the fabric 11 reciprocates with the carriage 14 in a fixed horizontal path.

Figure 19:
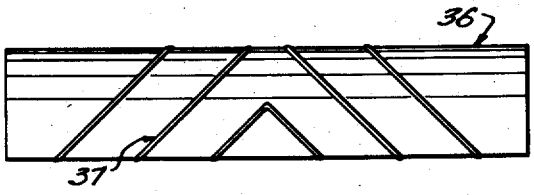
Fig. 19 is a front elevational view of the traveling fabric guiding apron.

With reference to Fig. 19 there is shown a front view of the fabric guiding apron 36, which is provided with a plurality of ribs 37, for guiding the traveling fabric 11 from the fabric supply roll 22 to the rest plate 16 and the pressure plate 18.

It will be readily understood that the traveling fabric 11 reciprocates with the carriage 14 in a predetermined sequence as described above to form various patterns in the fabric such as is shown in Fig. 10. The rate of feed of the traveling fabric 11 may be varied to get any desired number of stitches per inch or running length of the fabric. As is conventional in multiple-needle automatic quilting machines, the design or pattern to be sewed on the traveling fabric 11 is governed by three factors, the cam plate 106, the gearing for the feed rollers 26 and the arrangement of the needles 76. By varying these three factors in any combination a different design or pattern may be sewn on the traveling fabric 11. With reference to Fig. 10, altering the cam plate 106 alters the width 154 of the diamond 156 of fabric segment 94. By changing the gears of the feed rollers 26, the length 158 of the diamond 156 is varied, and by changing the needle spacing arrangement on the needle bracket 78 the width 154 of the diamond 156, relative to the length 158, is varied. From the above it will be seen that the number of variations of designs or patterns that may be formed on the surface of the traveling fabric 11 is practically unlimited. Continuous straight line stitching may be accomplished by using but a single row of needles and locking the carriage 14 against reciprocation.

Thus it will be seen that the above invention provides for a novel mechanism, for securing superposed threads to the surface of traveling fabric, which is readily attachable to a conventional multiple-needle automatic quilting machine. It will also be seen that the above invention is readily adaptable to produce an infinite number of decorative surface patterns by a simple and relatively quick machine adjustment and by the use of a variety of threads. It will also be seen that the above invention also may be used to produce shirred fabric and shirred and quilted fabric by a very simple, economical, and efficient means and method. There is also provided a new and novel threading needle for utilization in threading a multiple-needle automatic quilting machine embodying the mechanism of the present invention.

While there is shown and described herein certain specific structure embodying the invention it will be manifest to those skilled in the art that various modifications and rearrangements of the parts may be made without departing from the spirit and scope of the underlying inventive concept and that the same is not limited to the particular form herein shown and described except insofar as indicated by the scope of the appended claims.

Having thus described my invention, what I claim and desired to secure by Letters Patent, is:

1. In a multiple-needle automatic quilting machine, mechanism for securing a superposed thread to the surface of traveling fabric in a decorative pattern, said mechanism comprising a longitudinally slotted plate vertically reciprocable relative to said machine and a bar adapted to mate with said slot in said plate, said bar being axially reciprocable relative to said plate, said bar having a plurality of spaced transverse apertures adapted for the reception of said superposed thread and said bar having a plurality of apertured protuberances in alignment with said transverse apertures and adapted to receive said thread from said transverse apertures and guide said thread relative to the surface of said traveling fabric for securement to the surface of said fabric, said plate having a plurality of spaced cutout portions complementary to said protuberances and the area adjacent to said transverse apertures of said bar to provide clearance for said protuberances and the area adjacent to said transverse apertures on reciprocation of said bar and to provide clearance for threading said protuberances and said transverse apertures, and means associated with said bar for the axial intermittent reciprocation thereof.

2. In a multiple-needle automatic quilting machine, mechanism for securing a superposed thread to the surface of traveling fabric in a decorative pattern, said mechanism comprising a longitudinally slotted plate vertically reciprocable relative to said machine and a bar adapted to mate with said slot in said plate, said bar being axially reciprocable relative to said plate, a vertically reciprocable needle operable in a fixed path and adapted to lock stitch said superposed thread to the surface of said fabric, said bar having a plurality of spaced protuberances with aligned transverse apertures passing through said bar and protuberances and adapted for the reception of said superposed thread, said protuberances of said bar being adapted to reciprocate across the needle path sequentially whereby on one downstroke of said needle, the latter enters said fabric to stitch said thread with said protuberances positioned adjacent to and at one side of said needle and on the next downstroke of said needle, the latter enters said fabric to stitch said thread with said protuberances positioned adjacent to and at the other side of said needle to complete a cycle, said protuberances thereby guiding said superposed thread relative to the surface of said traveling fabric and said needle path for securement to the surface of said fabric by said stitch.

3. In a multiple-needle automatic quilting machine, mechanism for securing a superposed thread to the surface of traveling fabric in a decorative pattern, said mechanism comprising a longitudinally slotted plate vertically reciprocable relative to said machine and a bar adapted to mate with said slot in said plate, said bar being axially reciprocable relative to said plate, a vertically reciprocable needle operable in a fixed path and adapted to lock stitch said superposed thread to the surface of said fabric, said bar having a plurality of spaced protuberances with aligned transverse apertures passing through said bar and protuberances and adapted for the reception of said superposed thread, said protuberances of said bar being adapted to reciprocate across the needle path sequentially whereby on one downstroke of said needle, the latter enters said fabric to stitch said thread with said protuberances positioned adjacent to and at one side of said needle and on the next downstroke of said needle, the latter enters said fabric to stitch said thread with said protuberances positioned adjacent to and at the other side of said needle to complete a cycle, said protuberances thereby guiding said superposed thread relative to the surface of said traveling fabric and said needle path for securement to the surface of said fabric by said stitch, and means associated with said bar for the intermittent axial reciprocation thereof in sequentially timed relation with said reciprocable needle.

4. In a multiple-needle automatic quilting machine, mechanism for securing superposed threads to the surface of traveling fabric in a decorative pattern, said mechanism comprising a longitudinally slotted pressure plate intermittently reciprocable relative to said machine in a vertical path to allow said fabric to travel thereunder, a plurality of bars adapted to mate with said slots in said plate, said bars being axially reciprocable relative to said plate, a feed source for said superposed threads, and a plurality of vertically reciprocable spaced needles operable in a fixed path and adapted to stitch said superposed threads to said fabric in a preseelcted decorative pattern, said bars having a plurality of spaced integral protuberances with aligned transverse apertures passing through said bars and protbuerances, said threads from said feed source adapted to be reecived in said apertures, said protuberances of said bars being adapted to reciprocate across said needle path in timed sequential relationship with said reciprocable needles whereby on the downstroke of said needles, the latter penetrates said fabric to stitch said superposed threads to said fabric with said thread bearing protuberances positioned adjacent to and on alternate sides of said needles, said protuberances thereby guiding said superposed threads relative to the surface of said traveling fabric and said path of said needles whereby said superposed threads are stitched to said fabric by said needles with each stitch being in substantial alignment and on alternate sides of said threads.

5. In a multiple-needle automatic quilting machine, mechanism for securing superposed threads to the surface of traveling fabric in a decorative pattern, said mechanism comprising a longitudinally slotted pressure plate intermittently reciprocable relative to said machine in a vertical path to allow said fabric to travel thereunder, a plurality of bars adapted to mate with said slots in said plate, said bars being axially reciprocable relative to said plate, a feed source for said superposed threads, and a plurality of vertically reciprocable spaced needles operable in a fixed path and adapted to stitch said superposed threads to said fabric in a preselected decorative pattern, said bars having a plurality of spaced integral protuberances with aligned transverse apertures passing through said bars and protuberances, said threads from said feed source adapted to be received in said apertures, said protuberances of said bars being adapted to reciprocate across said needle path in timed sequential relationship with said reciprocable needles whereby on the downstroke of said needles, the latter penetrates said fabric to stitch said superposed threads to said fabric with said thread bearing protuberances positioned adjacent to and on alternate sides of said needles, said protuberances thereby guiding said superposed threads relative to the surface of said traveling fabric and said path of said needles whereby said superposed threads are stitched to said fabric by said needles with each stitch being in substantial alignment and on alternate sides of said threads, said plate having a plurality of spaced cutout portions complementary to said protuberances and the area adjacent to said transverse apertures of said bars to provide clearance for said protuberances and the area adjacent to said transverse apertures on reciprocation of said bars and to provide clearance for threading said protuberances and said transverse apertures, means associated with said bars for the axial intermittent reciprocation thereof, and means connected to said needles for the intermittent reciprocation thereof in sequential relationship with the reciprocation of said bars.

*6. In a multiple-needle automatic quilting machine, a carriage, means mounting said carriage for intermittent reciprocation in a horizontal plane, a fabric rest plate mounted for movement with said carriage to effect the reciprocation in a horizontal plane of traveling fabric mounted by said rest plate, a pressure plate mounted in said machine independently of said carriage, said pressure plate being vertically spaced above said rest plate, means for intermittently reciprocating said pressure plate vertically relative to said rest plate to permit said traveling fabric to pass between said pressure and rest plates, mechanism for securing a superposed thread to the surface of said fabric in a decorative pattern, said mechanism comprising structure mounted by said machine in cooperative association with said pressure plate for reciprocation relative thereto in said plane, said structure having means for guiding said superposed thread onto the surface of said fabric for securement thereto, means operable at said pressure plate for securing said guided superposed thread to the surface of said fabric is a decorative pattern, and means for reciprocating said carriage, said pressure plate and said structure in timed relation.*

*7. In a multiple-needle automatic quilting machine, a carriage, means mounting said carriage for intermittent reciprocation in a horizontal plane, a fabric rest plate mounted for movement with said carriage to effect the reciprocation in a horizontal plane of traveling fabric mounted by said rest plate, a pressure plate mounted in said machine independently of said carriage, said pressure plate being vertically spaced above said rest plate, means for intermittently reciprocating said pressure plate vertically relative to said rest plate to permit said traveling fabric to pass between said pressure and rest plates, structure mounted in said machine at said pressure plate, means mounting said structure for reciprocation relative to said pressure plate in said plane, said structure having means for guiding superposed threads onto the surface of said fabric for securement thereto, vertically reciprocable needles operable in a fixed path at said pressure plate for stitching said guide superposed threads to the surface of said fabric in a decorative pattern, and means for reciprocating said carriage, said pressure plate and said structure in timed relation.*

*8. In a multiple-needle automatic quilting machine, a carriage, means mounting said carriage for intermittent reciprocation in a horizontal plane, a fabric rest plate mounted for movement with said carriage to effect the reciprocation in a horizontal plane of traveling fabric mounted by said rest plate, a pressure plate mounted in said machine independently of said carriage, said pressure plate being vertically spaced above said rest plate, means for intermittently reciprocating said pressure plate vertically relative to said rest plate to permit said traveling fabric to pass between said pressure and rest plates, means for moving the fabric in the direction of its length between said rest and pressure plates, said carriage and fabric rest plate being intermittently reciprocable in a direction transversely of said direction of fabric movement to intermittently reciprocate the fabric in said transverse direction, structure mounted in said machine at said pressure plate, means mounting said structure for reciprocation relative to said pressure plate in said plane, said structure having means for guiding superposed threads onto the surface of said fabric for securement thereto, vertically reciprocable needles operable in a fixed path at said pressure plate for stitching said guided superposed threads to the surface of said fabric in a decorative pattern, and means for reciprocating said carriage, said pressure plate and said structure in timed relation.*

*9. In a multiple-needle automatic quilting machine, a carriage, means mounting said carriage for intermittent reciprocation in a horizontal plane, a fabric rest plate mounted for movement with said carriage to effect the reciprocation in a horizontal plane of traveling fabric mounted by said rest plate, a pressure plate mounted in said machine independently of said carriage, said pressure plate being vertically spaced above said rest plate, means for intermittently reciprocating said pressure plate vertically relative to said rest plate to permit said traveling fabric to pass between said pressure and rest plates, means for moving the fabric in the direction of its length between said rest and pressure plates, said carriage and fabric rest plate being intermittently reciprocable in a direction transversely of said direction of fabric movement to intermittently reciprocate the fabric in said transverse direction, a bar at said pressure plate for reciprocation in said transverse direction in said plane, a plurality of spaced apertures defined in said bar for the reception of superposed threads for guiding the latter onto the surface of said fabric for securement thereto, vertically reciprocable needles operable in a fixed path at said pressure plate for stitching said guided superposed threads to the surface of said fabric in a decorative pattern, and means for reciprocating said carriage, said pressure plate and said bar in timed relation.*

*10. In a multiple-needle automatic quilting machine, a carriage, means mounting said carriage for intermittent reciprocation in a horizontal plane, and in a lateral direction, a fabric rest plate secured to said carriage for reciprocation therewith in said plane and in said direction, a pressure plate mounted in said machine independently of said carriage and vertically spaced above said rest plate, means for intermittently reciprocating said pressure plate vertically relative to said rest plate to permit said traveling fabric to pass between said pressure and rest plates, means for moving the fabric in the direction of its length between said rest and pressure plates, said carriage and fabric rest plate being intermittently reciprocable in a direction transversely of said direction of fabric movement to intermittently reciprocate the fabric in said transverse direction, a bar carried by said pressure plate and mounted for axial reciprocation relative to said pressure plate in a horizontal plane and in said lateral direction, vertically reciprocable needles operable in a fixed path at said pressure plate in relation to said pressure plate for stitching superposed threads to the surface of said fabric, said bar having a series of spaced thread guides adapted for the reception of said superposed threads, said thread guides being adapted to reciprocate across the path of said needles sequentially during reciprocation of said bar whereby on one downstroke of said needles, the latter penetrate said fabric to stitch said threads with said guides positioned adjacent to and at one side of said needles and on the next downstroke of said needles, the latter penetrate said fabric to stitch said threads with said guides positioned adjacent to and at the other side of said needles to complete a cycle, said guides thereby guiding said superposed threads relative to the surface of the traveling fabric and the path of said needles for securement to the surface of said fabric by said stitching, and means for reciprocating said carriage, said pressure plate and said bar in timed relation.*

(References on following page)

References Cited in the file of this patent or the original patent

UNITED STATES PATENTS

| | | |
|---|---|---|
| 369,255 | Marhoeffer | Aug. 30, 1887 |
| 378,915 | Beck | Mar. 6, 1888 |
| 379,478 | Koch | Mar. 13, 1888 |
| 1,024,891 | Groebli | Apr. 30, 1912 |
| 1,283,477 | De Voe | Nov. 5, 1918 |
| 1,801,166 | Maier | Apr. 14, 1931 |
| 1,948,876 | Boettcher | Feb. 27, 1934 |
| 2,218,785 | Boettcher | Oct. 22, 1940 |
| 2,329,639 | Milstein | Sept. 14, 1943 |
| 2,418,347 | Haag | Apr. 1, 1947 |
| 2,476,602 | Harpham | July 19, 1949 |
| 2,500,211 | Sigoda | Mar. 14, 1950 |
| 2,525,312 | Prazak et al. | Oct. 10, 1950 |
| 2,538,395 | Stinson | Jan. 16, 1951 |
| 2,573,614 | Schwartz et al. | Oct. 30, 1951 |